United States Patent [19]

Takagi et al.

[11] Patent Number: 5,672,679
[45] Date of Patent: Sep. 30, 1997

[54] PROCESS FOR PRODUCING AMORPHOUS THERMOPLASTIC RESIN COMPOSITION

[75] Inventors: Kiyoji Takagi; Koji Nishida; Megumi Kojima, all of Mie, Japan

[73] Assignee: Mitsubishi Chemical Corporation, Tokyo, Japan

[21] Appl. No.: 566,319

[22] Filed: Dec. 1, 1995

Related U.S. Application Data

[63] Continuation of Ser. No. 272,134, Jul. 8, 1994, abandoned.

[30] Foreign Application Priority Data

Jul. 14, 1993 [JP] Japan .................. 5-174053
Sep. 27, 1993 [JP] Japan .................. 5-239360

[51] Int. Cl.$^6$ ............................................. C08F 6/10
[52] U.S. Cl. .................... 528/501; 528/497; 528/498; 528/502 C; 528/502 F
[58] Field of Search ...................... 528/501, 502 C, 528/502 F, 497, 498

[56] References Cited

U.S. PATENT DOCUMENTS

| | | | |
|---|---|---|---|
| 3,022,271 | 2/1962 | Darr et al. | 528/501 |
| 3,177,181 | 4/1965 | Baum et al. | 528/501 |
| 3,207,205 | 9/1965 | Briskin et al. | 528/501 |
| 3,437,638 | 4/1969 | Bottenbruch et al. | 528/501 |
| 3,536,680 | 10/1970 | Illing | 528/501 |
| 3,683,511 | 8/1972 | Johnson et al. | 528/501 |
| 4,198,265 | 4/1980 | Johnson | 528/501 |
| 4,332,760 | 6/1982 | Warfel | 528/502 F |
| 4,537,954 | 8/1985 | Ando et al. | 528/501 |
| 4,686,279 | 8/1987 | Nagtzaam et al. | 528/501 |
| 5,024,728 | 6/1991 | Morita et al. | 528/501 |
| 5,084,134 | 1/1992 | Mattiussi et al. | 528/501 |
| 5,140,077 | 8/1992 | Sivavec et al. | 528/501 |
| 5,310,776 | 5/1994 | Takagi et al. | 528/501 |
| 5,459,168 | 10/1995 | Nasr et al. | 528/501 |

FOREIGN PATENT DOCUMENTS

| | | |
|---|---|---|
| 226669 | 2/1960 | Australia ............... 528/502 |
| 0 246 358 | 11/1987 | European Pat. Off. . |
| 0 418 728 | 3/1991 | European Pat. Off. . |
| 0 569 980 | 11/1993 | European Pat. Off. . |

*Primary Examiner*—Thomas R. Weber
*Attorney, Agent, or Firm*—Oblon, Spivak, McClelland, Maier & Neustadt, P.C.

[57] ABSTRACT

In a process for producing an amorphous thermoplastic resin composition comprising melt-kneading at least one amorphous thermoplastic resin, an improvement comprising melt-kneading the amorphous thermoplastic resin in the presence of not less than 1% by weight, based on the amorphous thermoplastic resin, of an organic solvent in a kneader having a vent hole(s) while maintaining at least one vent hole of the kneader under reduced pressure by means of an evacuator to remove the organic solvent so as to reduce the organic solvent content in the final composition to less than 1% by weight. Thermal deterioration of the resin during melt-kneading can be inhibited to provide a resin composition having well-balanced impact resistance and heat resistance and excellent hue.

17 Claims, No Drawings

PROCESS FOR PRODUCING AMORPHOUS THERMOPLASTIC RESIN COMPOSITION

This application is a Continuation of application Ser. No. 08/272,134, filed on Jul. 8, 1994, now abandoned.

FIELD OF THE INVENTION

This invention relates to a process for producing a polymer blend having improved properties. More particularly, it relates to an improvement in a process for producing a resin composition comprising melt-kneading at least one amorphous thermoplastic resin in the presence of an organic solvent.

BACKGROUND OF THE INVENTION

Amorphous thermoplastic resins are generally melt-kneaded at temperatures higher than the melting point or glass transition point. Melt-kneading is attended by shear heat generation, which accelerates thermal deterioration of the resin, such as gelation and carbonization, and the resulting resin composition has reduced moldability or provides moldings with poor appearance or deteriorated impact resistance.

Approaches to inhibit shear heat generation during melt-kneading include (1) reduction of the cylinder temperature of a melt-kneader, (2) reduction of the number of rotation of a melt-kneader, (3) reduction of the viscosity of the composition by, for example, addition of a plasticizer, (4) reduction of the degree of polymerization of the resin, and (5) addition of a soft-flow polymer.

Methods (1) and (2) are not always effective due to limitations of performance of a kneader, such as a cooling system or a motor torque. Method (3) is successful in controlling thermal deterioration but often with the result that the characteristics essential to the resin, particularly heat resistance, are impaired. Methods (4) and (5) cost the final composition the mechanical strength.

SUMMARY OF THE INVENTION

As a result of extensive investigations, the present inventors have found that amorphous thermoplastic resins can be prevented from thermal deterioration during melt-kneading by conducting the melt-kneading in the presence of an organic solvent while maintaining at least one vent hole of a kneader under reduced pressure so as to finally reduce the organic solvent content to less than 1% by weight to provide a final resin composition with improved physical properties, and thus reached the present invention.

The present invention relates to a process for producing an amorphous thermoplastic resin composition comprising melt-kneading at least one amorphous thermoplastic resin, in which the melt-kneading is conducted in the presence of not less than 1% by weight, based on the amorphous thermoplastic resin, of an organic solvent in a kneader having a vent hole(s) while maintaining at least one vent hole of the kneader under reduced pressure by means of an evacuator to remove the organic solvent so as to reduce the organic solvent content in the final composition to less than 1% by weight.

DETAILED DESCRIPTION OF THE INVENTION

Amorphous thermoplastic resins generally have glassy character, showing only a glass transition point but no definite melting point on heating. In the present invention, those having a glass transition point of not lower than 50° C. are preferably used. While amorphous thermoplastic resins have neither definite melting point nor measurable heat of fusion, the amorphous thermoplastic resins which can be used in the present invention include those exhibiting more or less crystallinity when slowly cooled and also those showing crystallinity to such a degree that will not seriously impair the effects of the present invention. Glass transition point, melting point and heat of fusion are measured with a differential scanning calorimeter (DSC), such as "DSC-II" manufactured by Perkin-Elmer Co. A sample is once heated above an estimated melting point and then cooled to 20° C. at a rate of 10° C./min. After allowed to stand at that temperature for about 1 minute, the sample is again heated at a rate of 10° C./min. Where the heat of fusion measured in temperature rise and that measured in temperature fall agree with each other within the range of experimental errors, that value is adopted. The amorphous thermoplastic resin to be used in the present invention is defined to be such that has a heat of fusion of less than 1 cal/g as above measured.

The amorphous thermoplastic resin which can be used in the present invention include polyphenylene ethers (hereinafter abbreviated as PPE), inclusive of homopolymers and copolymers having a structural unit represented by formula (I):

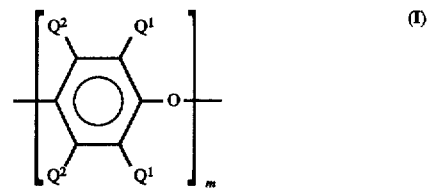

wherein $Q^1$ represents a halogen atom, a primary or secondary alkyl group, an aryl group, an aminoalkyl group, a halogenated hydrocarbon group, a hydrocarbon oxy group, or a halogenated hydrocarbon oxy group; $Q^2$ represents a hydrogen atom, a halogen atom, a primary or secondary alkyl group, an aryl group, a halogenated hydrocarbon group, a hydrocarbon oxy group or a halogenated hydrocarbon oxy group; and m represents an integer of 10 or greater.

Suitable examples of the primary alkyl group as $Q^1$ or $Q^2$ include methyl, ethyl, n-propyl, n-butyl, n-amyl, isoamyl, 2-methylbutyl, n-hexyl, 2,3-dimethylbutyl, 2-, 3- or 4-methylpentyl, and heptyl groups. Suitable examples of the secondary alkyl group as $Q^1$ or $Q^2$ include isopropyl, sec-butyl, and 1-ethylpropyl groups. In most cases, $Q^1$ represents an alkyl group or a phenyl group, and particularly an alkyl group having from 1 to 4 carbon atoms, and $Q^2$ represents a hydrogen atom.

Suitable PPE homopolymers are those comprising a 2,6-dimethyl-1,4-phenylene ether unit, and suitable PPE copolymers are random copolymers comprising a 2,6-dimethyl-1,4-phenylene ether unit and a 2,3,6-trimethyl-1,4-phenylene ether unit. A number of suitable PPE homopolymers and random copolymers are described in patents and literature. For example, PPE containing a unit for modifying various characteristics, such as a molecular weight, a melt viscosity and/or impact strength, are suitably used.

PPE to be used in the present invention preferably has an intrinsic viscosity at 30° C. in chloroform of from 0.2 to 0.8 dl/g, still preferably from 0.30 to 0.80 dl/g, more preferably from 0.35 to 0.75 dl/g, still more preferably from 0.40 to 0.70 dl/g, and most preferably from 0.45 to 0.60 dl/g. If the intrinsic viscosity is less than 0.2 dl/g, the resulting composition tends to have insufficient impact resistance. If it exceeds 0.8 dl/g, the composition tends to have deteriorated moldability to provide moldings with poor appearance.

The amorphous thermoplastic resins which can be used in the present invention also include aromatic alkenyl compound polymers. The aromatic alkenyl compound polymers include homo- or copolymers obtained by polymerizing one or more aromatic alkenyl compounds represented by formula (II):

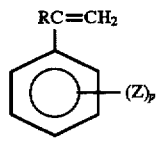

(II)

wherein R represents a hydrogen atom, a lower alkyl group (e.g., an alkyl group having from 1 to 4 carbon atoms) or a halogen atom; Z represents a hydrogen atom, a vinyl group, a halogen atom or a lower alkyl group; and p represents 0 or an integer of from 1 to 5;

copolymers comprising an aromatic alkenyl compound and maleic anhydride, acrylonitrile, methyl methacrylate, a lower alkyl acrylate or butadiene; and aromatic alkenyl compound-grafted copolymers obtained by suspending resin particles of polyethylene, an ethylene-vinyl acetate copolymer, an ethylene-acrylic acid copolymer, polypropylene, polyamide or polyethylene terephthalate in water and conducting suspension polymerization in the presence of an aromatic alkenyl compound.

Specific examples of the aromatic alkenyl compound are styrene, α-methylstyrene, divinylbenzene, and ethylvinylbenzene. Specific examples of the aromatic alkenyl compound polymers include styrene homopolymers, such as polystyrene (PS), polychlorostyrene, and poly-α-methylstyrene; and styrene copolymers, such as so-called high-impact polystyrene (HIPS), an acrylonitrile-styrene copolymer (AS), an acrylonitrile-butadiene-styrene copolymer (ABS), a butadiene-acrylonitrile-α-methylstyrene copolymer, a styrene-methyl methacrylate copolymer, a styrene-n-alkyl methacrylate copolymer, a methyl methacrylate-butadiene-styrene copolymer (MBS), a maleic anhydride-butadiene-styrene copolymer (MABS), maleic anhydride-styrene copolymer (MAS), a styrene-α-methylstyrene copolymer, a styrene-4-methylstyrene copolymer, a styrene-N-phenylmaleimide copolymer, a styrene-N-alkyl-substituted phenylmaleimide copolymer, a styrene-acrylic acid copolymer, styrene-grafted polyethylene, a styrene-grafted ethylene-vinyl acetate copolymer, (styrene and/or acrylic acid)-grafted polyethylene, styrene-grafted polyamide, an acrylonitrile-acrylic rubber-styrene copolymer disclosed in JP-A-48-48547 (the term "JP-A" as used herein means an "unexamined published Japanese patent application"), an acrylonitrile-chlorinated polyolefin-styrene copolymers disclosed in JP-A-48-42452; and an ethylvinylbenzene-divinylbenzene copolymer.

Polycarbonate resins (hereinafter abbreviated as PC) are also useful as the amorphous thermoplastic resin. PC which can be used in the present invention include aromatic PC, aliphatic PC, and aliphatic-aromatic PC. Preferred of them are aromatic PC comprising a bisphenol skeleton, such as 2,2-bis(4-hydroxyphenyl)alkane-based PC, bis(4-hydroxyphenyl)ether-based PC, bis(4-hydroxyphenyl) sulfone-based PC, bis(4-hydroxyphenyl) sulfide-based PC, and bis(4-hydroxyphenyl) sulfoxide-based PC. If desired, PC comprising a halogen-substituted bisphenol skeleton may be used.

While not limiting, PC to be used usually has a molecular weight of 10,000 or higher, and preferably 20,000 to 40,000.

In addition, amorphous polyolefin resins, aromatic polysulfone, aromatic polyether sulfone, aromatic amorphous polyamide, silicone resins, polyether imide, polyacrylate, and polyalkyl acrylate are useful as amorphous thermoplastic resins.

Of the above-mentioned amorphous thermoplastic resins, PPE, an aromatic alkenyl compound polymer, a combination of PPE and an aromatic alkenyl compound polymer, and a combination of PPE and HIPS are preferred. In particular, the PPE/HIPS combination preferably comprises from 5 to 95 parts by weight, more preferably from 25 to 85 parts by weight, and most preferably from 30 to 65 parts by weight, of PPE, per 100 parts by weight of the total amount of PPE and HIPS.

The organic solvent which can be used in the present invention is not particularly limited as long as it is inert to phenols having been subjected to nuclear substitution and liquid at ambient temperature. Examples of usable organic solvents include aromatic hydrocarbons, such as benzene, toluene, and xylene; cyclic or acyclic aliphatic hydrocarbons, such as heptane and cyclohexane; halogenated hydrocarbons, such as chlorobenzene, dichlorobenzene, trichlorobenzene, and dichloromethane; ethers, such as dioxane and diethyl ether; ketones, such as cyclohexanone and acetophenone; esters, such as ethyl acetate and propiolactone; nitriles, such as acetonitrile and benzonitrile; alcohols, such as methanol, ethanol, n-propanol, isopropanol, n-butanol, sec-butanol and amylalcohol; nitrobenzene, ε-caprolactam and sulfolane. These organic solvents may be used either individually or in combination thereof. Preferred of them are those which are good solvents for amorphous thermoplastic resins and have a solubility parameter between 7 and 12 $(cal.cm^{-3})^{1/2}$, and more preferred are aromatic hydrocarbons having from 6 to 18 carbon atoms, halogenated hydrocarbons having from 2 to 10 carbon atoms, and alcohols having from 1 to 10 carbon atoms. Xylene, toluene, dichlorobenzene, and trichlorobenzene are particularly preferred.

The organic solvent is used in an amount of not less than 1% by weight, preferably from 1 to 50% by weight, more preferably from 2 to 30% by weight, and most preferably from 5 to 30% by weight, based on the amorphous thermoplastic resin(s). If the amount of the organic solvent is less than 1% by weight, molded articles obtained from the composition are unsatisfactory in impact resistance and appearance.

The final content of the organic solvent in the resulting resin composition must be less than 1% by weight. It is preferably not more than 0.9% by weight, and still preferably not more than 0.5% by weight. If the final organic solvent content is not less than 1% by weight, molded articles obtained from the composition are unsatisfactory in heat resistance and appearance.

The resin composition of the present invention may further comprise other known supplementary components, such as antioxidants, weathering agents, nucleating agents, flame retardants, impact modifiers, plasticizers, and flow modifiers. Addition of organic or inorganic fillers or reinforcing agents, particularly glass fiber, mica, talc, wollastonite, potassium titanate, calcium carbonate or silica is effective to improve rigidity, heat resistance, dimensional accuracy, and the like. As an aid for practical utility, various colorants and dispersants therefor may be added.

Any kneaders generally used for thermoplastic resins can be used in the present invention, provided that they have at least one vent hole. Examples of suitable kneaders include singe- or multi-screw extruders, a roll, a Banbury mixer, a hot roll, a Brabender, and other various vented kneaders.

Because the vent hole must be kept under reduced pressure, at least part of the resin in front of the vent hole of a kneader should be melted and sealed under reduced pressure. The resin in a kneader will suffer from a reduction in impact resistance if maintained in a molten state for a long time before reaching the vent hole. Therefore, it is desirable to melt the resin immediately before reaching the vent hole as close to the vent hole as possible.

The evacuator to be connected to the vent hole is not limited in type or model and selected so as to have an ability in accordance with the desired degree of vacuum at the vent hole. The pressure at the vent hole is preferably set at 200 mmHg or lower, still preferably not higher than 100 mmHg, more preferably not higher than 50 mmHg, and still more preferably not higher than 30 mmHg, and most preferably not higher than 10 mmHg. If it is higher than 200 mmHg, the composition has insufficient heat resistance, and molded articles obtained therefrom have unsatisfactory appearance.

All the necessary components may be fed to a kneader all at once, or some of them may previously be blended. Further, the individual components may separately be fed through several feed openings of an extruder cylinder. The organic solvent may be added directly into an extruder using a pump.

Molding methods of the thermoplastic resin composition of the present invention are not particularly restricted. Any method commonly employed for thermoplastic resins, i.e., injection molding, blow molding, extrusion, sheeting, thermoforming, rotational molding, laminating, and press molding, can be applied.

The present invention will now be illustrated in greater detail with reference to Examples, but the present invention should not be construed as being limited thereto.

EXAMPLES 1 TO 12

Components used were as follows.
Amorphous Thermoplastic Resin:
(a-1) PPE: Poly(2,6-dimethyl-1,4-phenylene ether), experimentally prepared by Nippon Polyether K.K.; intrinsic viscosity: 0.53 dl/g at 30° C. in chloroform
(a-2) HIPS: High-impact polystyrene "Diarex HT 76", produced by Mitsubishi Kasei Corporation
(a-3) ABS: ABS resin "Stylac 121", produced by Asahi Chemical Industry Co., Ltd.
(a-4) PC: Polycarbonate "Iupilon S-3000", produced by Mitsubishi Gas Chemical Co., Inc.
(a-5) PMMA: Polymethyl methacrylate "Acrypet MD", produced by Mitsubishi Rayon Co., Ltd.
(a-6) SMA: Styrene-maleic anhydride copolymer "Stapron SM200", produced by DSM
Organic Solvent:
(b-1) Xylene: Commercially available product of reagent grade
(b-2) Trichlorobenzene:
Commercially available product of reagent grade The amorphous thermoplastic resin(s) shown in Table 1 below other than organic solvents were thoroughly mixed by stirring in a supermixer, and the mixture was fed to a twin-screw extruder ("TEX 44" manufactured by The Japan Steel Works, Ltd.) set at a temperature of from 180° to 230° C. and at a screw revolution speed of from 250 to 350 rpm, and the organic solvent shown in Table 1 was added to the first kneading part of the extruder by means of a pump. The mixture was melt-kneaded while keeping the vent hole made downstream from the first kneading part under reduced pressure as shown in Table 1 and then pelletized.

The resulting pellets were injection molded in an in-line screw injection machine ("IS-90B" manufactured by Toshiba Machine Co., Ltd.) at a cylinder temperature of from 260° to 280° C. and at a mold cooling temperature of from 60° to 80° C. to prepare specimens.

The pellets had been dried at 0.1 mmHg and 80° C. for 48 hours in a vacuum drier right up until they were subjected to injection molding. Immediately after the molding, the specimens were placed in a desiccator and left at 23° C. for 4 to 6 days, and then tested.

Various physical properties of the specimen were measured according to the following test methods. The results obtained are shown in Table 1.

(1) Flexural Modulus:
Measured in accordance with ISO R 178-1974 Procedure 12 (JIS K 7203) with an Instron tester.
(2) Izod Impact Strength:
Measured in accordance with ISO R 180-1969 (JIS K 7110) "Notched Izod Impact Strength" with an Izod impact tester (manufactured by Toyo Seiki Co., Ltd.).
(3) Heat Distortion Temperature:
Measured in accordance with JIS K 7207 under a load of 18.6 kg with an HDT tester (manufactured by Toyo Seiki Co., Ltd.)

TABLE 1

|  | Example 1 | Example 2 | Example 3 | Example 4 | Example 5 | Example 6 |
|---|---|---|---|---|---|---|
| Composition (part by wt.) | | | | | | |
| Thermoplastic resin: | | | | | | |
| PPE (a-1) | 100 | — | — | — | — | — |
| HIPS (a-2) | — | 100 | — | — | — | — |
| ABS (a-3) | — | — | 100 | — | — | — |
| PC (a-4) | — | — | — | 100 | — | — |
| PMMA (a-5) | — | — | — | — | 100 | — |
| SMA (a-6) | — | — | — | — | — | 100 |
| Organic solvent: | | | | | | |
| Xylene (b-1) | 10 | 10 | 10 | — | 10 | 10 |
| Trichlorobenzene (b-2) | — | — | — | 10 | — | — |
| Kneading Conditions | | | | | | |
| Vent hole pressure (mmHg) | 10 | 10 | 10 | 10 | 10 | 10 |
| Final organic solvent | 0.8 | 0.5 | 0.7 | 0.3 | 0.2 | 0.5 |

TABLE 1-continued

| | | | | | | |
|---|---|---|---|---|---|---|
| content (wt %) | | | | | | |
| Test Results | | | | | | |
| Flexural modulus (23° C.) (kg/cm$^2$) | 25800 | 23400 | 23000 | 23000 | 30000 | 19200 |
| Izod impact strength (23° C.) (kg · cm/cm$^2$) | 7 | 10 | 16 | NB* 89 | 2 | 20 |
| Heat distortion temperature (18.6 kg) (°C.) | 195 | 82 | 83 | 135 | 90 | 98 |

| | Example 7 | Example 8 | Example 9 | Example 10 | Example 11 | Example 12 |
|---|---|---|---|---|---|---|
| Composition (part by wt.) | | | | | | |
| Thermoplastic resin: | | | | | | |
| PPE (a-1) | — | — | — | — | 45 | — |
| HIPS (a-2) | 100 | 100 | 100 | 100 | 55 | — |
| ABS (a-3) | — | — | — | — | — | 50 |
| PC (a-4) | — | — | — | — | — | 50 |
| PMRA (a-5) | — | — | — | — | — | — |
| SMA (a-6) | — | — | — | — | — | — |
| Organic solvent: | | | | | | |
| Xylene (b-1) | — | 5 | 3 | 3 | 10 | — |
| Trichlorobenzene (b-2) | 10 | — | — | — | — | 10 |
| Kneading Conditions | | | | | | |
| Vent hole pressure (mmHg) | 10 | 10 | 10 | 10 | 160 | 10 |
| Final organic solvent content (wt %) | 0.9 | 0.4 | 0.5 | 0.7 | 0.9 | 0.3 |
| Test Results | | | | | | |
| Flexural modulus (23° C.) (kg/cm$^2$) | 22800 | 22700 | 22500 | 22000 | 25800 | 23100 |
| Izod impact strength (23° C.) (kg · cm/cm$^2$) | 11 | 9.5 | 9 | 9 | 9 | NB* 58 |
| Heat distortion temperature (18.6 kg) (°C.) | 81 | 82 | 82 | 82 | 140 | 106 |

Note: *NB indicates that no break was observed.

Comparative Examples 1 to 6 and 8

Experiments were conducted in the same manner as in the aforementioned Examples, except for adding no organic solvent. The results obtained are shown in Table 2 below.

Comparative Example 7

An experiment was conducted in the same manner as in Example 1, except that the vent hole was opened to the air. The results obtained are shown in Table 2 below.

TABLE 2

| | Compar. Example 1 | Compar. Example 2 | Compar. Example 3 | Compar. Example 4 | Compar. Example 5 | Compar. Example 6 | Compar. Example 7 | Compar. Example 8 |
|---|---|---|---|---|---|---|---|---|
| Composition (part by wt.) | | | | | | | | |
| Thermoplastic resin: | | | | | | | | |
| PPE (a-1) | 100 | — | — | — | — | — | 100 | 45 |
| HIPS (a-2) | — | 100 | — | — | — | — | — | 55 |
| ABS (a-3) | — | — | 100 | — | — | — | — | — |
| PC (a-4) | — | — | — | 100 | — | — | — | — |
| PMMA (a-5) | — | — | — | — | 100 | — | — | — |
| SMA (a-6) | — | — | — | — | — | 100 | — | — |
| Organic solvent: | | | | | | | | |
| Xylene (b-1) | — | — | — | — | — | — | 10 | — |
| Kneading Conditions | | | | | | | | |
| Vent hole pressure (mmHg) | 10 | 10 | 10 | 10 | 10 | 10 | 760 | 10 |
| Final organic solvent | — | — | — | — | — | — | 8.7 | — |

TABLE 2-continued

|  | Compar. Example 1 | Compar. Example 2 | Compar. Example 3 | Compar. Example 4 | Compar. Example 5 | Compar. Example 6 | Compar. Example 7 | Compar. Example 8 |
|---|---|---|---|---|---|---|---|---|
| content (wt %) |  |  |  |  |  |  |  |  |
| Results of Evaluation |  |  |  |  |  |  |  |  |
| Flexural modulus (23° C.) (kg/cm$^2$) | 26000 | 23100 | 24000 | 23000 | 28800 | 19200 | 25400 | 25400 |
| Izod impact strength (23° C.) (kg · cm/cm$^2$) | 4 | 6 | 13 | 25 | 1.2 | 12 | 5 | 5 |
| Heat distortion temperature (18.6 kg) (°C.) | 195 | 83 | 85 | 135 | 87 | 98 | 153 | 138 |

EXAMPLES 13 TO 22

Components used were as follows.
Amorphous Thermoplastic Resin:
(a-7) PPE: Poly(2,6-dimethyl-1,4-phenylene ether), experimentally prepared by Nippon Polyether K.K.; intrinsic viscosity: 0.41 dl/g at 30° C. in chloroform
(a-2) HIPS:. The same as in the aforementioned Examples
Organic Solvent:
Commercially available xylene of first class grade and commercially available trichlorobenzene of first class grade
Others:
LLDPE: Linear low-density polyethylene "Mitsubishi Polyethlene F 30F", produced by Mitsubishi Petrochemical Co., Ltd.; melt flow rate: 1.0 g/10 min
Process oil:
Process oil "Diana Process Oil PW-380", produced by Idemitsu Kosan Co., Ltd.
Titanium dioxide (TiO$_2$):
Titanium dioxide "Tipaque CR 63", produced by Ishihara Sangyo Kaisha, Ltd.

The components shown in Table 3 below other than organic solvents were thoroughly mixed by stirring in a Henschel mixer, and the mixture was fed to a twin-screw extruder "TEX 44" set at a temperature of from 180° to 230° C. and at a screw revolution speed of from 250 to 350 rpm, and the organic solvent shown in Table 3 was added to the first kneading part by means of a pump. The mixture was melt-kneaded while keeping the vent hole made downstream from the first kneading part under reduced pressure as shown in Table 3 and then pelletized.

The resulting pellets were injection molded in an in line screw injection machine "IS-90B" at a cylinder temperature of from 260° to 280° C. and at a mold cooling temperature of from 60° to 80° C. to prepare specimens.

Immediately after molding, the specimens were placed in a desiccator and left at 23° C. for 4 to 6 days, and then tested in the same manner as in the aforementioned Examples. Further, the hue (Lightness value, L value) of the specimen was measured with a hue and color difference meter "CR-200" manufactured by Minolta Co., Ltd. in accordance with JIS Z 8730. The results obtained are shown in Table 3.

TABLE 3

|  | Example No. | | | | | | | | | |
|---|---|---|---|---|---|---|---|---|---|---|
|  | 13 | 14 | 15 | 16 | 17 | 18 | 19 | 20 | 21 | 22 |
| Composition (part by wt.) |  |  |  |  |  |  |  |  |  |  |
| PPE (a-7) | 50 | 50 | 50 | 50 | 50 | 50 | 40 | 60 | 50 | 50 |
| HIPS (a-2) | 50 | 50 | 50 | 50 | 50 | 50 | 60 | 40 | 50 | 50 |
| LLDPE | — | 2 | 2 | 2 | 2 | 2 | 2 | 2 | 2 | 2 |
| Process oil | — | — | — | — | — | — | — | — | 2 | 2 |
| TiO$_2$ | — | — | — | — | — | — | — | — | — | 3 |
| Xylene | 10 | 5 | 10 | 20 | 10 | — | 10 | 10 | 10 | 10 |
| Trichlorobenzene | — | — | — | — | — | 10 | — | — | — | — |
| Kneading Conditions |  |  |  |  |  |  |  |  |  |  |
| Vent hole pressure (mmHg) | 20 | 20 | 20 | 20 | 50 | 20 | 20 | 20 | 20 | 20 |
| Final organic solvent content (wt %) | 0.6 | 0.3 | 0.6 | 0.8 | 0.9 | 0.8 | 0.7 | 0.5 | 0.6 | 0.5 |
| Test Results |  |  |  |  |  |  |  |  |  |  |
| Flexural modulus (23° C.) (kg/cm$^2$) | 25000 | 25000 | 25000 | 24000 | 24000 | 24000 | 24000 | 26000 | 25000 | 25000 |
| Izod impact strength (23° C.) (kg · cm/cm$^2$) | 8 | 10 | 13 | 18 | 13 | 12 | 11 | 15 | 14 | 14 |
| Heat distortion temperature (18.6 kg) (°C.) | 132 | 132 | 131 | 129 | 128 | 130 | 124 | 135 | 130 | 131 |
| Hue (L value) | 48 | 71 | 74 | 75 | 73 | 74 | 71 | 70 | 74 | 90 |

Comparative Examples 9 and 10

Experiments were conducted in the same manner as in Example 13 or 14, except for adding no organic solvent. The results obtained are shown in Table 4 below.

Comparative Example 11

An experiment was conducted in the same manner as in Example 15, except that the amount of the organic solvent added was less than 1% by weight. The results obtained are shown in Table 4.

Comparative Example 12

An experiment was conducted in the same manner as in Example 15, except that the vent hole was opened to the air. The results obtained are shown in Table 4.

TABLE 4

|  | Compar. Example 9 | Compar. Example 10 | Compar. Example 11 | Compar. Example 12 |
|---|---|---|---|---|
| Composition (part by wt.): |  |  |  |  |
| PPE (a-7) | 50 | 50 | 50 | 50 |
| HIPS (a-2) | 50 | 50 | 50 | 50 |
| LLDPE | — | 2 | 2 | 2 |
| Process oil | — | — | — | — |
| TiO$_2$ | — | — | — | — |
| Xylene | — | — | 0.5 | 10 |
| Trichlorobenzene | — | — | — | — |
| Kneading Conditions: |  |  |  |  |
| Vent hole pressure (mmHg) | 20 | 20 | 20 | *760 |
| Final organic solvent content (wt %) | — | — | 0.1 | 8.9 |
| Test Results: |  |  |  |  |
| Flexural modulus (23° C.) (kg/cm$^2$) | 25000 | 25000 | 25000 | 23000 |
| Izod impact strength (23° C.) (kg · cm/cm$^2$) | 5 | 6.8 | 6.5 | 13 |
| Heat distortion temperature (18.6 kg) (°C.) | 134 | 134 | 134 | 91 |
| Hue (L value) | 40 | 68 | 69 | 73 |

Note: *Atmospheric pressure

As is apparent from the results in Tables 1 to 4, the process of the present invention is effective to inhibit thermal deterioration during melt-kneading to provide amorphous thermoplastic resin compositions having well-balanced resistance to impact and heat and excellent hue. The thus obtained resin compositions have broadened applications and industrial advantages.

While the invention has been described in detail and with reference to specific examples thereof, it will be apparent to one skilled in the art that various changes and modifications can be made therein without departing from the spirit and scope thereof.

What is claimed is:

1. A process for producing an amorphous thermoplastic resin composition comprising melt-kneading at least two amorphous resins which are selected from the group consisting of only amorphous resins and wherein said two amorphous resins are different from each other, in which said melt-kneading is conducted in the presence of not less than 1% by weight, based on the amorphous thermoplastic resin, of an organic solvent in a kneader having a vent hole(s) while maintaining at least one vent hole of the kneader under reduced pressure by means of an evacuator to remove the organic solvent so as to reduce the organic solvent content in the final composition to less than 1% by weight, wherein said organic solvent is added in an amount of from 2 to 30% by weight based on the amorphous resin and wherein said at least two amorphous resins have a glass transition point of not lower than 50° C. and a heat of fusion of less than 1 cal/g.

2. A process as claimed in claim 1, wherein said amorphous resins are at least one resin selected from the group consisting of polyphenylene ether, an aromatic alkenyl compound polymer, an amorphous polyolefin resin, aromatic polysulfone, aromatic polyether sulfone, aromatic amorphous polyamide, a silicone resin, polyether imide, polyacrylate, and a polyalkyl acrylate.

3. A process as claimed in claim 1, wherein said amorphous resins are polyphenylene ether, an aromatic alkenyl compound polymer or a combination thereof.

4. A process as claimed in claim 3, wherein said aromatic alkenyl compound polymer is at least one resin selected from the group consisting of polystyrene, polychlorostyrene, poly-α-methylstyrene, high-impact polystyrene, an acrylonitrile-styrene copolymer, an acrylonitrile-butadiene-styrene copolymer, a butadiene-acrylonitrile-α-methylstyrene copolymer, a styrene-methyl methacrylate copolymer, a styrene-n-alkyl methacrylate copolymer, a methyl methacrylate-butadiene-styrene copolymer, a maleic anhydride-butadiene-styrene copolymer, a maleic anhydride-styrene copolymer, a styrene-α-methylstyrene copolymer, a styrene-4-methylstyrene copolymer, a styrene-N-phenylmaleimide copolymer, a styrene-N-alkyl-substituted phenylmaleimide copolymer, a styrene-acrylic acid copolymer, styrene-grafted polyethylene, a styrene-grafted ethylene-vinyl acetate copolymer, (styrene and/or acrylic acid)-grafted polyethylene, styrene-grafted polyamide, an acrylonitrile-acrylic rubber-styrene copolymer, and an acrylonitrile-chlorinated polyolefin-styrene copolymer.

5. A process as claimed in claim 1, wherein said amorphous thermoplastic resins are a combination of polyphenylene ether and high-impact polystyrene.

6. A process as claimed in claim 5, wherein said combination comprises from 5 to 95 parts by weight of polyphenylene ether and from 5 to 95 parts by weight of high-impact polystyrene.

7. A process as claimed in claim 5, wherein said combination comprises from 25 to 85 parts by weight of polyphenylene ether and from 15 to 75 parts by weight of high-impact polystyrene.

8. A process as claimed in claim 5, wherein said combination comprises from 30 to 65 parts by weight of polyphenylene ether and from 35 to 70 parts by weight of high-impact polystyrene.

9. A process as claimed in claim 1, wherein said organic solvent is selected from the group consisting of an aromatic hydrocarbon having from 6 to 18 carbon atoms, a halogenated hydrocarbon having from 2 to 10 carbon atoms, and an alcohol having from 1 to 10 carbon atoms.

10. A process as claimed in claim 1, wherein said organic solvent is selected from the group consisting of xylene, toluene, dichlorobenzene, and trichlorobenzene.

11. A process as claimed in claim 1, wherein said organic solvent is added in an amount of from 5 to 30% by weight based on the amorphous thermoplastic resin.

12. A process as claimed in claim 1, wherein the organic solvent content in the final composition is not more than 0.9% by weight.

13. A process as claimed in claim 1, wherein the organic solvent content in the final composition is not more than 0.5% by weight.

14. A process as claimed in claim 1, wherein the vent hole pressure is not higher than 200 mmHg.

15. A process as claimed in claim 1, wherein the vent hole pressure is not higher than 100 mmHg.

16. A process as claimed in claim 1, wherein the vent hole pressure is not higher than 50 mmHg.

17. A process as claimed in claim 1 wherein said amorphous resins are at least one resin selected from the group consisting of polyphenylene ether, an aromatic alkenyl compound polymer, aromatic polysulfone, aromatic polyethersulfone, aromatic amorphous polyamide, a silicone resin, a polyetherimide, polyacrylate and a polyalkyl acrylate.

* * * * *